United States Patent [19]
Gurner et al.

[11] Patent Number: 6,072,537
[45] Date of Patent: Jun. 6, 2000

[54] SYSTEMS FOR PRODUCING PERSONALIZED VIDEO CLIPS

[75] Inventors: Asaf Gurner; Nimrod Sumner, both of Kfar Sava, Israel

[73] Assignee: U-R Star Ltd., Kfar Sava, Israel

[21] Appl. No.: 08/779,878

[22] Filed: Jan. 6, 1997

[51] Int. Cl.[7] .................................................. H04N 5/265
[52] U.S. Cl. .......................... 348/586; 348/584; 348/591
[58] Field of Search .................................. 348/584–587, 348/590–592, 598, 599, 211–213, 239; H04N 5/265, 9/75, 5/272, 5/275, 5/232

[56] References Cited

U.S. PATENT DOCUMENTS

| | | |
|---|---|---|
| 3,749,822 | 7/1973 | Van der Veer et al. . |
| 3,961,133 | 6/1976 | Bennett . |
| 4,092,673 | 5/1978 | Adams .................................... 348/211 |
| 4,202,008 | 5/1980 | King . |
| 4,393,394 | 7/1983 | McCoy . |
| 4,486,774 | 12/1984 | Maloomian . |
| 4,580,158 | 4/1986 | Macheboeuf . |
| 4,698,682 | 10/1987 | Astle . |
| 4,811,084 | 3/1989 | Belmares-Sarabia et al. . |
| 4,991,019 | 2/1991 | Enami . |
| 5,144,454 | 9/1992 | Cury . |
| 5,198,902 | 3/1993 | Richards et al. ......................... 348/598 |
| 5,262,865 | 11/1993 | Herz . |
| 5,278,662 | 1/1994 | Womach et al. . |
| 5,301,027 | 4/1994 | Kiyofuji et al. . |
| 5,345,313 | 9/1994 | Blank ..................................... 348/598 |
| 5,347,306 | 9/1994 | Nitta . |
| 5,369,441 | 11/1994 | Enari . |
| 5,382,980 | 1/1995 | Gerhrmann . |
| 5,404,437 | 4/1995 | Nguyen . |
| 5,448,315 | 9/1995 | Soohoo . |
| 5,459,529 | 10/1995 | Searby et al. . |
| 5,563,668 | 10/1996 | Ozaki et al. . |

FOREIGN PATENT DOCUMENTS

| | | | |
|---|---|---|---|
| 55-71363 | 5/1980 | Japan ..................................... 358/183 |
| 4-83480 | 3/1992 | Japan ............................. H04N 5/272 |
| 5-207502 | 8/1993 | Japan ............................... H04N 9/75 |
| 6-133221 | 5/1994 | Japan ............................. H04N 5/265 |
| 1503612 | 3/1978 | United Kingdom .............. 358/22 CK |

OTHER PUBLICATIONS

Leonard, Eugene, "Considerations Regarding the Use of Digital Data to Generate Video Backgrounds", SMPTE Journal, vol. 87, Aug. 1978.

*Primary Examiner*—David E. Harvey
*Attorney, Agent, or Firm*—Mark M. Friedman

[57] ABSTRACT

A system for producing multiple personalized video sequences of a subject includes a storage medium storing a foreground video sequence of an element of interest which has been pre-mixed to enable keyed superposition over an other video image, and a video camera for generating a background video signal corresponding to a real-time video sequence of the subject. A mixer superposes the foreground video sequence over the background video signal to produce a combination video sequence in which the subject appears together with the element of interest. A video monitor is provided for displaying the combination video sequence as it is mixed. The system may be constructed as an automated machine with an automatic payment system and a media recorder and feeder. Preferably, the system includes camera and lighting control systems for producing effects in the real-time video signal to mimic similar effects in the pre-recorded video sequence.

4 Claims, 4 Drawing Sheets

SYSTEMS FOR PRODUCING PERSONALIZED VIDEO CLIPS

FIELD AND BACKGROUND OF THE INVENTION

The present invention relates to processing of video images and, in particular, it concerns systems and methods for producing personalized video clips in which a subject appears together with elements of a pre-recorded video clip.

It is known to mix video images by various techniques. One of the most common techniques for achieving a high quality superposition of a subject over a pre-existing image is chroma-key.

The chroma-key technique involves filming a subject in front of a monochrome background, typically blue, under uniform shadowless lighting conditions. This ensures that all parts of the image other than the subject himself have a constant precisely defined color and brightness. The blue pixels are then "keyed-out", i.e., regarded as transparent, during superposition over a pre-existing image during mixing. The result is that the subject appears seamlessly as a part of the pre-existing clip.

For convenience of reference, the keyed image is referred to as the "foreground image" since it is superimposed over the second image during mixing. Conversely, the full-frame non-keyed image is termed the "background image" since a part of it is obscured during the mixing process.

Chroma-key techniques have been used extensively in film and television studios for such applications as news presentation and comic effects. Where the subject is required to appear to interact with some element of the background image, a real-time display of the mixed image is provided as visual feedback to the subject.

The very specific filming conditions required for the foreground image make the technique very expensive. As a result, high quality chroma-key type combined video sequences have hitherto only been available to production teams working in the context of a professional movie studio.

There is therefore a need for low cost systems and methods which would employ keyed-superposition techniques to generate high quality personalized combined video clips of a subject together with graphic elements of interest under normal lighting conditions. It would also be advantageous to have systems which provide additional visual indications which appear to verify the simultaneous presence of the subject and the graphic elements of interest within a video clip.

SUMMARY OF THE INVENTION

The present invention provides systems and methods for producing personalized video clips of a subject together with graphic elements of interest.

According to the teachings of the present invention there is provided, a system for producing a combined video signal mixed from a pre-existing video clip and a real-time video image, the system comprising: (a) a storage medium storing the pre-existing clip; (b) a video camera for generating the real-time video image; (c) a camera control mechanism responsive to data associated with the pre-existing clip to control the video camera such that a characteristic of the real-time video image varies in substantially the same manner as, and substantially in step with, a corresponding characteristic of the pre-existing clip; and (d) a mixer for mixing the pre-existing video clip and the real-time video image.

According to a further feature of the present invention, the camera control system varies a zoom setting of the camera in a manner mimicking a corresponding zoom factor of the pre-existing clip.

According to a further feature of the present invention, the camera control system varies an angular position of the camera so as to substantially match variations in the field of view in the pre-existing clip.

According to a further feature of the present invention, the camera control system changes the position of the camera so as to substantially match variations in the field of view in the pre-existing clip.

According to a further feature of the present invention, the data associated with the pre-existing clip is also stored in the storage medium.

There is also provided according to the teachings of the present invention, a system for producing a combined video signal mixed from a pre-existing video clip and a real-time video image, the system comprising: (a) a storage medium storing the pre-existing clip; (b) a video camera for generating the real-time video image; (c) a light; (d) a light control mechanism responsive to data associated with the pre-existing clip to control the light such that a characteristic of the real-time video image varies in substantially the same manner as, and substantially in step with, a corresponding characteristic of the pre-existing clip; and (e) a mixer for mixing the pre-existing video clip and the real-time video image.

According to a further feature of the present invention, the light control system varies an illumination intensity of the light so as to substantially match apparent lighting variations in the pre-existing clip.

According to a further feature of the present invention, the light control system varies an angular position of the light so as to substantially match apparent lighting variations in the pre-existing clip.

According to a further feature of the present invention, the light control system varies an effective light source position so as to substantially match apparent lighting variations in the pre-existing clip.

There is also provided according to the teachings of the present invention, a system for producing multiple personalized video sequences of a subject, the system comprising: (a) a storage medium storing at least one foreground video sequence including an element of interest, the foreground video sequence being pre-mixed to enable keyed superposition over an other video image; (b) a video camera for generating a background video signal corresponding to a video sequence of the subject; (c) a synchronizing device for synchronizing between frames of the foreground video sequence and frames of the background video signal; (d) a mixer for superposing the foreground video sequence over the background video signal to produce a combination video sequence in which the subject appears together with the element of interest; and (e) a video monitor for displaying the combination video sequence substantially concurrently with generation of the background video signal, thereby enabling simulated interaction with the element of interest.

According to a further feature of the present invention, both the foreground video sequence and the background video signal are in a full-frame video format.

According to a further feature of the present invention, the storage medium additionally stores a pre-stored audio signal associated with the foreground video sequence.

According to a further feature of the present invention, there are also provided: (a) a microphone for inputting a real-time audio signal corresponding to the background video sequence; and (b) audio mixing means for mixing the pre-recorded audio signal with the real-time audio signal to provide mixed audio signal associated with the combination video sequence.

According to a further feature of the present invention, the mixed audio signal includes a variable proportion of the real-time audio signal to the prerecorded audio signal, the proportion being altered dynamically based on data associated with the foreground video sequence.

According to a further feature of the present invention, there is also provided an external special effects device associated with the video camera, the special effects device being responsive to data associated with the foreground video sequence to process the background video signal so as to mimic special effects in the foreground video sequence.

According to a further feature of the present invention, the special effects device processes the background video signal to generate an effect selected from fading, wiping and dissolving.

According to a further feature of the present invention, the storage medium stores a plurality of the foreground video clips, the system further comprising selection means operable by the subject to select one of the foreground video clips for use.

According to a further feature of the present invention, there is also provided a video recording apparatus for recording the combination video sequence.

According to a further feature of the present invention, there is also provided an interface for controlling a characteristic of element of interest in foreground sequence.

According to a further feature of the present invention, the system is implemented integrally with a video camera apparatus, the system further comprising switching means for selectively activating the mixer for switching between a normal video camera mode and a superposing mode.

According to a further feature of the present invention, there is also provided an automated payment system.

There is also provided according to the teachings of the present invention, a system for producing multiple personalized video sequences, each sequence including a subject, the system comprising: (a) a processor for generating a foreground video signal corresponding to at least one dynamic graphic element, the foreground signal being formatted to enable keyed superposition over a video image; (b) a video camera for generating a background video signal corresponding to a video sequence of the subject; (c) a synchronizing device for synchronizing between frames of the foreground video signal and frames of the background video signal; (d) a mixer for superposing the foreground video signal over the background video signal to produce a combination video sequence in which the subject appears together with the graphic element; and (e) a video monitor for displaying the combination video sequence substantially concurrently with generation of the background video signal, thereby enabling simulated interaction with the graphic element.

According to a further feature of the present invention, there is also provided an input device, and the processor is responsive to the input device to change at least one characteristic of the graphic element.

There is also provided according to the teachings of the present invention, a method for generating personalized video sequences of each of a plurality of subjects together with an element of interest, the method comprising the steps of: (a) producing a foreground video sequence of the element of interest, the foreground video sequence being premixed to enable keyed superposition over an other video sequence; and (b) for each of the plurality of subjects: (i) generating a video signal corresponding to video images of the subject under ambient lighting conditions, (ii) synchronizing between frames of the video signal and frames of the foreground video sequence, (iii) mixing the video signal and the foreground video sequence to generate a combination video sequence in which the foreground video sequence is superposed over the video signal such that the element of interest appears together with the subject, and (iv) displaying the combination video sequence substantially simultaneously with generation of the corresponding video signal.

There is also provided, according to the teachings of the present invention, a system for producing multiple personalized video sequences, each sequence including a subject, the system comprising: (a) a decoder for decoding a cable video signal corresponding to a foreground video sequence of at least one dynamic graphic element, the foreground video sequence being formatted to enable keyed superposition over a another video image; (b) a video camera for generating a background video signal corresponding to a video sequence of the subject; (c) a synchronizing device for synchronizing between frames of the foreground video sequence and frames of the background video signal; (d) a mixer for superposing the foreground video sequence over the background video signal to produce a combination video sequence in which the subject appears together with the graphic element; and (e) a video monitor for displaying the combination video sequence substantially concurrently with generation of the background video signal, thereby enabling simulated interaction with the graphic element.

There is also provided according to the teachings of the present invention, a system for producing and dispensing multiple personalized video sequences, each sequence including a subject superimposed on a pre-existing video clip, the system comprising: (a) a monochrome background screen; (b) a video camera for generating a video signal corresponding to a video sequence of the subject in front of the screen; (c) a mixer for performing keyed superposition of the video signal over a pre-existing video clip to generate a combination video sequence in which the subject appears as a part of the clip; (d) a video monitor for displaying the combination video sequence substantially concurrently with generation of the video signal; and (e) recording and feeding apparatus for dispensing video media containing the combination video sequence.

According to a further feature of the present invention, there are also provided: (a) a library containing a plurality of pre-recorded video clips; and (b) a user interface for allowing selection of one of the pre-recorded video clips to be mixed with the video signal.

According to a further feature of the present invention, there is also provided an automated charging apparatus.

According to a further feature of the present invention, the screen is formed as a back-lit panel so as to be relatively insensitive to ambient lighting conditions.

BRIEF DESCRIPTION OF THE DRAWINGS

The invention is herein described, by way of example only, with reference to the accompanying drawings, wherein:

FIG. 6 is a schematic cross-sectional view through an actively illuminated colored screen for reducing sensitivity to ambient light conditions during chroma-key filming.

DESCRIPTION OF THE PREFERRED EMBODIMENTS

The present invention provides systems and methods for producing personalized video clips of a subject together with graphic and video elements of interest.

The principles and operation of systems and methods according to the present invention may be better understood with reference to the drawings and the accompanying description.

Figure 1:
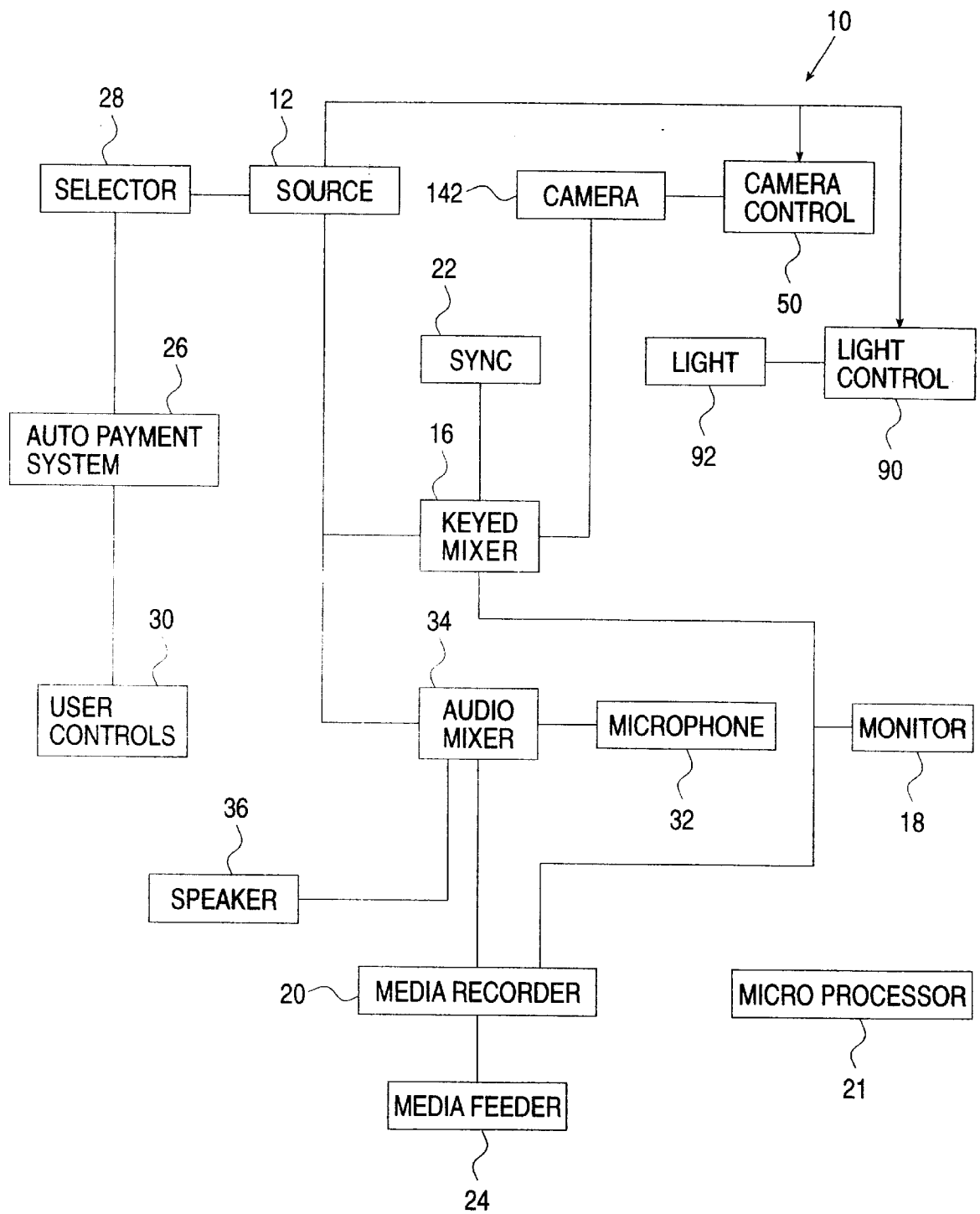
FIG. 1 is a schematic block diagram of a system for producing personalized video clips of a subject together with a graphic element of interest, constructed and operative according to the teachings of the present invention.

Referring now to the drawings, FIG. 1 shows a block diagram of a system for producing personalized video clips, generally designated 10, constructed and operative according to the teachings of the present invention.

Generally speaking, system 10 includes a source 12 for providing at least one video sequence including an element of interest, a video camera 14 for generating a video signal corresponding to a video sequence of the subject, and a mixer 16 for mixing the two signals to produce a combination video sequence in which the subject appears together with the element of interest. The combination video sequence is preferably displayed in real-time on a video monitor 18, and is typically recorded by a media recorder 20.

It is a particular feature of most preferred embodiments of the present invention that system 10 can operate repeatedly and indefinitely without requiring highly specialized lighting conditions to provide personalized video clips of many different subjects. This is achieved by providing source 12 with clips specially prepared for keyed superposition over a conventional video image. Thus, it is the pre-recorded clip which is a foreground sequence pre-encoded for use of a keying technique, whereas the image of the subject is produced as a standard background video sequence requiring no special provisions. Typically, both the pre-recorded clip and the video sequence of the subject are in a standard full-frame video format.

As mentioned earlier, the term "foreground image" is used to refer to an image which has one or more element of interest bordered by specially identified pixels which are regarded as transparent during a mixing process. The most common type of "keying" is chroma-key in which pixels having a standard color, typically blue, are regarded as transparent. Also common in digital processing is the use of α-channel keying. In other techniques, coding of pixels may be done by groups defined by various algorithms. However, it should be appreciated that the particular choice of technique employed is not essential to the present invention, and that the present invention applies equally to these and any other techniques which allow keyed superposition.

Conversely, the term "background image" is used to refer to an image which has no special intrinsic features for allowing keyed superposition. Such an image can, however, be combined with a properly prepared foreground image to generate a high quality combined image.

By employing foreground images for the pre-recorded source sequences, the present invention minimizes the expensive production processes of keying techniques to a one-time outlay. The source clips then available may be used repeatedly, and at multiple locations, with very simple equipment to generate high quality combined products personalized for many different subjects.

Before proceeding with the detailed description of the components of system 10 shown in FIG. 1, it should be noted that the embodiment shown includes many optional features which may be used in different combinations or omitted altogether. It should also be noted that the functional connections shown between the elements are given merely as examples, and to aid in the understanding of the system. However, it will be readily understood by one ordinarily skilled in the art that the arrangement of the elements and their interconnections may be varied considerably, and that some of the embodiments described below may require such minor modifications.

Furthermore, it should be noted that system 10 preferably operates under the control and coordination of a microprocessor 21. Microprocessor 21 is typically functionally connected to most, if not all, of the components of system 10, and may in some cases serve to replace the direct links illustrated in the Figure. However, in order not to overcomplicate the Figure, the functional links to microprocessor 21 have been omitted.

Turning now to the features of system 10 in more detail, different embodiments of system 10 may implement source 12 in a number of forms. Typically, source 12 is a storage medium which stores one or more pre-mixed foreground clips. The storage means may be of any type, and may store the clips in any conventional video format. Typically, best results are obtained by employing digital formats, although analogue implementations also fall within the scope of the present invention.

In an alternative implementation, source 12 is an appropriately programmed microprocessor device for generating a graphic element of interest. In this case, the graphic element may be generated by techniques well known in the field of computer games. In addition, where a full-frame video format is used, the graphic must be converted into the appropriate format with the addition of keying information to enable keyed superposition of the graphic over another video image.

In a further alternative implementation, it is envisaged that a dedicated cable channel could be provided for supplying pre-keyed foreground clips for home use in producing combined video clips. In this case, source 12 would be implemented as a decoder for decoding the cable signal to reconstruct the foreground video signal.

Camera 14 may be any type of video camera. Here too, best results are achieved by use of digital video equipment, although analogue implementations also fall within the scope of the present invention.

Mixer 16 employs conventional technology to mix the signals from source 12 and camera 14 to generate a combined video sequence in which the element of interest from the foreground video sequence appears together with the subject and background of the background video signal. In order to enable precise mixing, a synchronizing device 22 is provided.

A range of synchronizing devices is known, many of which may be employed in system 10. Typically, synchronizing device 22 employs frame-grabbing and delay circuitry to correct any timing mismatch between the two input signals. Alternatively, depending on the type of camera employed, synchronizing device 22 may directly control camera 14 to sample the real-time image in step with frames from source 12.

Monitor 18 may be any type of video display capable of displaying the combination video sequence including, but not limited to, a television screen or a computer monitor. The combination video sequence is displayed instantaneously as the background video signal is generated, thereby enabling the subject to see the combined results and to simulate interaction with the element of interest.

In a preferred embodiment, monitor 18 is adapted, either through hardware design or by use of an appropriate image processor, to display the combined image inverted horizontally. This inversion makes the subject appear as his mirror image, thereby making it easier for the subject to relate the visual feedback to his physical movements. It should be emphasized that the horizontal inversion is solely for real-time display purposes, leaving the combined video sequence unchanged for recording or remote display.

It should be noted that, for a number of applications, the real-time video output through one or more monitor 18 may be the only "product" required, such that media recorder 20 becomes optional. Such a system is of value as a marketing tool for allowing a potential buyer to see himself alongside a personality or graphic associated with a product. The system can also function as a "video-kareoke" system.

Media recorder 20 may be any type of video recording apparatus including, but not limited to, a video tape recorder, laser disk system or a digital video disk (DVD) system.

In a preferred embodiment of the present invention, system 10 is constructed as an automated system. In this case, system 10 features a media feeder 24 for supplying blank recording media to recorder 20 and subsequently feeding it out to the user. An automated embodiment of system 10 preferably also features an automated payment system 26 for effecting payment by cash and/or credit cards.

In an alternative embodiment of the invention, system 10 is implemented integrally as part of a video camera apparatus suitable for home use. In this case, system 10 is somewhat streamlined, without need for media feeder 24 and payment system 26. An additional switching mechanism (not shown) is provided for selectively activating the mixer so that the camera can be switched between a normal video camera mode and a superposing mode. For this embodiment, monitor 18 may simply be the standard view-finder of the camera apparatus, allowing the camera operator to adjust the camera view and to give indirect feedback to the subject as necessary.

Typically, it is desirable to provide a plurality of foreground video clips, giving the subject a choice of well known celebrities, cartoon characters or other video or graphic elements of interest to appear in the combined clip. For this purpose, system 10 is provided with a selection mechanism 28 for selecting one of the foreground video clips.

Additionally, it is preferable to provide a number of user-operable controls 30 for controlling a characteristic of element of interest in foreground sequence. The nature of the user-operable controls and the characteristic they affect varies according to the implementation of the invention. In a simple case, the controls may allow freezing and restarting of the foreground clip, or adjustment of its speed, or of its alignment within the combined image. In a more complex case, the user has control over special effects to be introduced to the mixing process or the like. In the case of a computer generated source graphic, the user controls preferably allow interactive control over changes in the appearance or actions of the computer generated graphic in a manner similar to computer game controls.

It is a preferred feature of system 10 that source 12 additionally stores a pre-stored audio signal associated with the foreground video sequence. This audio signal is then employed to produce an audio track to accompany the combined video sequence. Preferably, the final audio track contains elements both from the pre-stored audio signal and from a real-time audio signal associated with the subject. To this end, system 10 has a microphone 32 for inputting a real-time audio signal corresponding to the background video sequence, and an audio mixer 34, connected to both source 12 and microphone 32, for mixing the pre-recorded audio signal with the real-time audio signal to provide a final mixed audio signal for the combination video sequence. The mixed audio signal is typically passed directly from audio mixer 34 to media recorder 20 to be recorded as an audio track to the combination video sequence.

In order to facilitate apparent audio interaction between the subject and the pre-recorded audio signal, a speaker 36 is preferably provided. Speaker 36 may provide either the pre-recorded audio signal alone, or the mixed audio signal. In the latter case, care must be taken in the system design to avoid the possibility of audio feedback via microphone 32.

Figure 5:
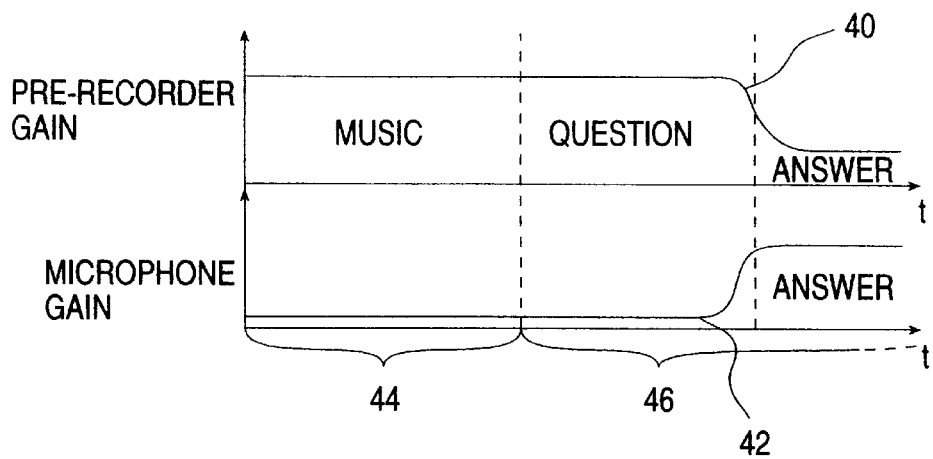
FIG. 5 is a schematic representation of the time variation of gain for two audio channels during mixing.

Referring now briefly to FIG. 5, it is preferable that the mixed audio signal includes a variable proportion of the real-time audio signal to the pre-recorded audio signal. For example, this feature may be used to allow audio input from the subject while minimizing the background noise picked-up by microphone 32 at times that the subject is not speaking. In a simple implementation, the proportion of real-time audio in the mixed audio signal is manually switched by one of user controls 30, acting as an on-off switch for the real-time audio input. The switch itself could be either an on-off control for microphone 32 directly, or an input to audio mixer 34.

In a preferred embodiment, the proportion of the two audio sources is altered dynamically based on data associated with the foreground video sequence. Details of possible formats for this data will be described below with reference to camera and lighting control systems. An example of such an embodiment is shown in FIG. 5 in which plot 40 represents the gain applied to the pre-recorded audio signal and plot 42 represents the gain applied to the real-time audio signal, both as a function of time. During a first part 44 of the foreground video sequence in which no audio interaction is intended, the gain of the pre-recorded audio signal 40 remains much higher than that of the real-time audio 42, thereby making the pre-recorded audio signal dominant over any background noise. Then, during a second part 46 of the foreground video sequence, the pre-recorded audio signal contains material, such as questions, for initiating an audio interaction. During this period, the relative gains of the two audio inputs are synchronized to switch backwards and forwards, providing high gain for microphone 32 at the times appropriate for an audio input from the subject while reducing it at other times to minimize background noise.

Turning now additionally to FIGS. 2–4, optional features associated with camera and lighting control systems, constructed and operative according to the teachings of the present invention, will be described. These systems control the filming conditions of the background clip to provide various visual effects synchronized to mimic similar effects in the pre-recorded foreground clip. These synchronized effects provide apparent visual evidence that the foreground element and the subject are actually side-by-side, thereby generating strikingly realistic results.

Turning first to camera control, system 10 preferably includes a camera control mechanism 50. Control mechanism 50 is responsive to data associated with the pre-existing clip to control video camera 14 such that a characteristic of the real-time video image varies in substantially the same manner as, and substantially in step with, a corresponding characteristic of the pre-existing clip. Control mechanism 50 may vary from a simple electronic zoom-control up to a fully robotic camera support arm with up to six degrees of rotational and translational freedom, according to the range of effects which are to be used in the pre-existing clip.

Figure 2A:
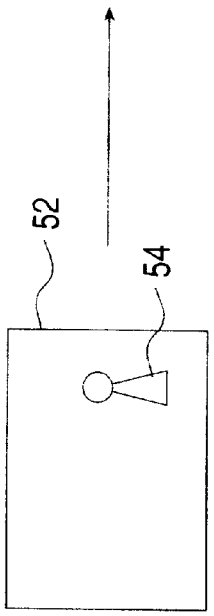
FIG. 2A is a schematic representation of a pre-recorded clip sequence in which the zoom factor changes.
Figure 2A:
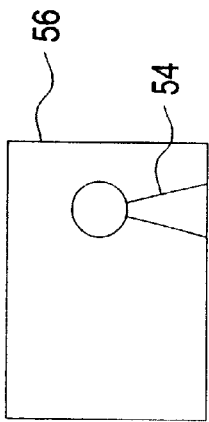
Figure 2B:
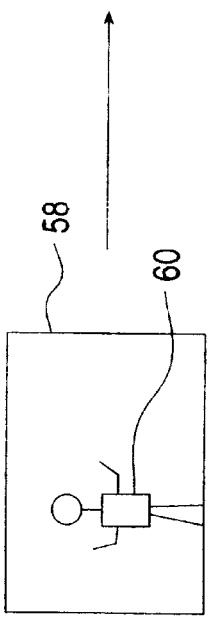
FIG. 2B is a schematic representation of a real-time video sequence in which a camera is adjusted to match changes in the zoom factor of the pre-recorded clip of FIG. 2A.
Figure 2B:
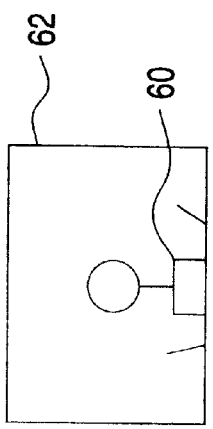
Figure 2C:
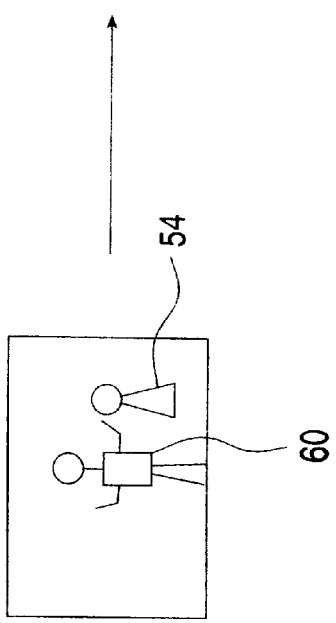
FIG. 2C is a schematic representation of a combined video sequence made from the sequences of FIGS. 2A and 2B.
Figure 2C:
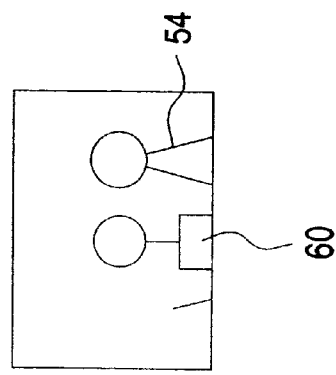

FIGS. 2A–2C illustrate a first example of the use of camera control mechanism 50 in which the pre-recorded clip (FIG. 2A) has a varying zoom factor. Thus, in a first frame 52, the element of interest 54 appears relatively small, whereas in a second later frame 56, element 54 appears much larger. To mimic this apparent zoom effect of the pre-recorded clip, camera control mechanism 50 alters the zoom setting of camera 14 such that, at a first time corresponding to frame 52, the real-time video image 58 (FIG. 2B) shows the subject 60 relatively small, whereas at a second time corresponding to frame 56, the real-time video image 62 is zoomed-in on subject 60. The resultant combined image (FIG. 2C) gives an impression of simultaneously zooming-in on both element 54 and subject 60, as if they were really side-by-side.

Figures 3A, 3B, 3C, 3D:
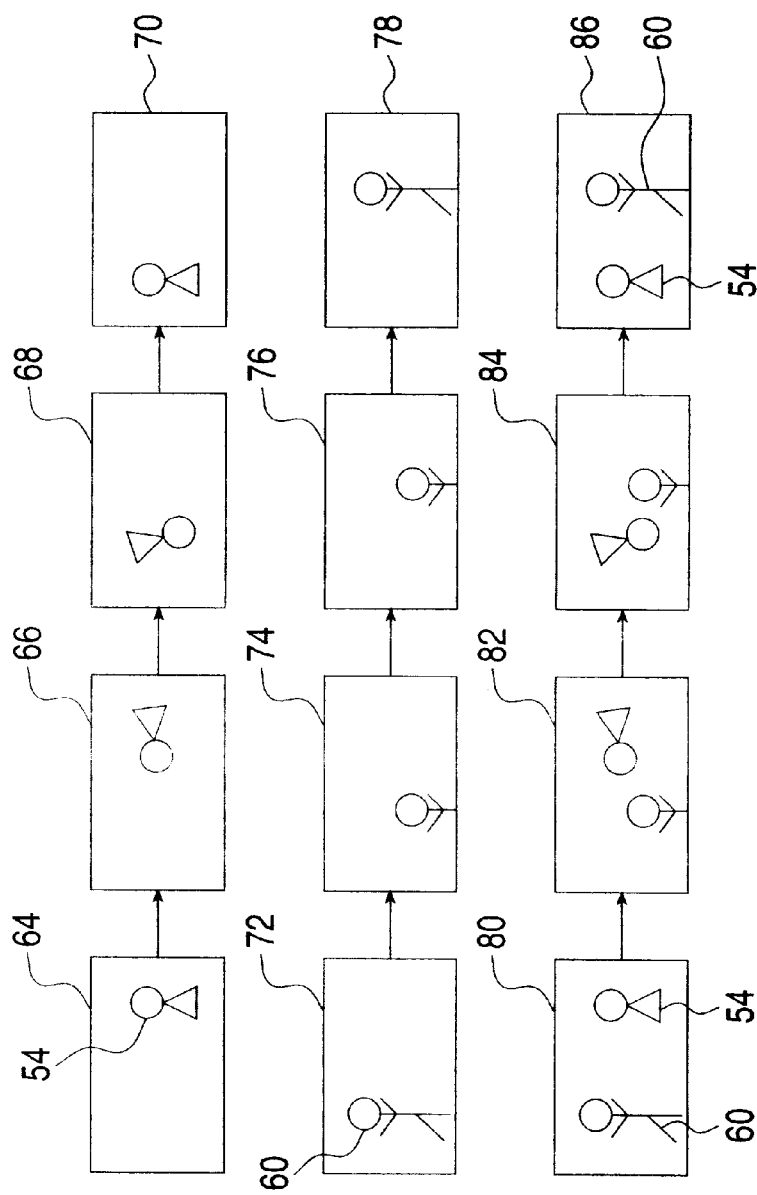
FIG. 3A is a schematic representation of a pre-recorded clip sequence in which the field of view appears to vary.
FIG. 3B is a schematic representation of a real-time video sequence in which a camera is tilted to match the apparent field of view changes of the pre-recorded clip of FIG. 3A.
FIG. 3C is a schematic representation of a combined video sequence made from the sequences of FIGS. 3A and 3B.
FIG. 3D is a schematic representation of the camera movement required to produce the sequence of FIG. 3B.

FIGS. 3A–3D illustrate a second example of the use of camera control mechanism 50 in which the pre-recorded clip (FIG. 3A) has apparent variation of its field of view. Thus, a series of selected frames (64–70) from the pre-recorded clip shows element 54 jumping. The frames are composed such that the apparent field of view changes between the frames. FIG. 3B shows a corresponding real-time video sequence (frames 72–78) in which camera control mechanism 50 varies the angular position of camera 14 so as to substantially match the apparent variations of field of view in the pre-existing clip. As a result, the position of subject 60 within the frames varies. FIG. 3D illustrates the progression of the camera field of view relative to the stationary subject to produce the sequence of FIG. 3B. FIG. 3C shows the resultant combined video sequence (frames 80–86) in which the field of view realistically follows element 54 as it jumps over the head of subject 60.

Additional applications of camera control mechanism include changing the position of camera 14 during filming, or switching between two different cameras to mimic a changing field of view in the pre-recorded clip.

Turning now to lighting control, system 10 preferably includes a lighting control mechanism 90 for controlling a lighting system 92. Lighting control mechanism 90 is responsive to data associated with the pre-existing clip to control lighting system 92 such that a characteristic of the real-time video image varies in substantially the same manner as, and substantially in step with, a corresponding characteristic of the pre-existing clip.

Lighting system 92 may be a single light, or a more complicated arrangement including a number of light sources to be used alternately or in combination. Lighting control mechanism 90 typically functions to switch, dim, flash or otherwise control the intensity of one or more of the lights, or switch between them. Lighting control mechanism 90 may also include robotic control of the physical direction, position and collimation of one or more light source. These capabilities enable lighting control mechanism 90 to vary the lighting conditions of the real-time video sequence to substantially match apparent lighting variations in the pre-existing clip, including variations in the apparent position, angle and intensity of the light source.

Figure 4A:
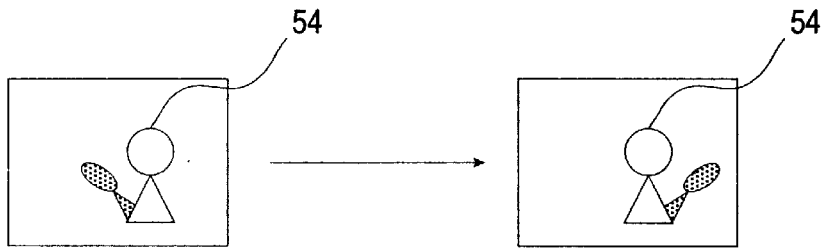
FIG. 4A is a schematic representation of a pre-recorded clip sequence in which the illumination conditions appear to change.
Figure 4B:
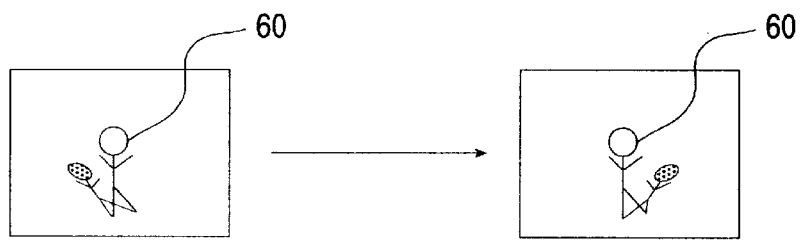
FIG. 4B is a schematic representation of a real-time video sequence in which lighting conditions are adjusted to match the apparent changes in illumination conditions of the pre-recorded clip of FIG. 4A.
Figure 4C:
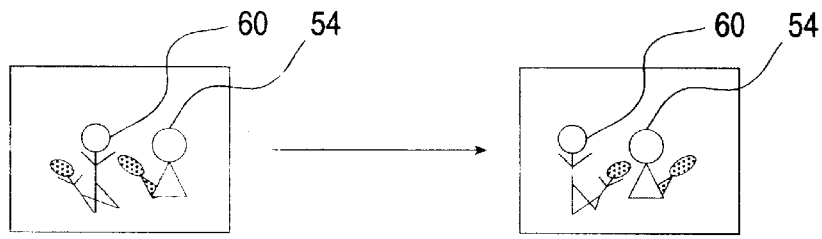
FIG. 4C is a schematic representation of a combined video sequence made from the sequences of FIGS. 4A and 4B.

FIGS. 4A–4C illustrate one example of an application of lighting control mechanism 90 in which pre-recorded clip (FIG. 4A) features a changing shadow direction. Thus, in a first frame 94, element 54 appears to be right-illuminated (i.e., with its shadow to the left) whereas in a second frame 96 it appear to be left-illuminated (i.e., shadow to the right). FIG. 4B shows a corresponding real-time video sequence in which light control mechanism 90 moves an element of lighting system 92, or switches between two elements thereof, so as to produce a similar change in shadow direction. The results of the combination video sequence are illustrated in FIG. 4C in which element 54 and subject 60 are perceived to be illuminated from a common varying source.

Both in the case of camera control system 50 and lighting control system 90, it should be noted that the object is to generate sufficient similarity between the observed effects that an observer perceives the similarities as visual evidence of juxtaposition of the subject and the element of interest. However, it is typically not necessary to achieve high precision matching of the effects. Thus, slight variations in the angles of shadows, or mismatches between zooming of 80% and 90%, between the images of subject 60 and element 54 are not usually noticeable. The degree of similarity required to provide this impression is referred to herein as "substantially mimicking".

A number of references have been made above to the use of data associated with the pre-recorded clip. This data may be for the purposes of coordinating operation of camera control mechanism 50, lighting control mechanism 90, for altering the relative gains in mixing of the audio signals in mixer 34 described above, or for any combination thereof. This data is most conveniently stored in the form of a timing chart, indexed to correspond to each pre-recorded clip, stored for access by microprocessor 21. The content of the chart may be stored in a memory device associated with microprocessor 21, or may be supplied from source 12. Microprocessor 21 then counts frames of the pre-recorded clip as indicated by the sync. channel associated with the clip, and actuates camera control mechanism 50, lighting control mechanism 90, and/or audio mixer 34, as required.

Alternatively, the data may be stored in a form directly interpretable by the appropriate devices on a purpose-made data channel recorded together with the pre-recorded clip.

The present invention has been described primarily in preferred embodiments in which the pre-recorded clip is a foreground clip pre-mixed for keyed superposition, and the real-time video image is a background clip requiring no specialized filming conditions. However, it should be noted that numerous aspects of the present invention may also be applied to great advantage when applied to a system using pre-recorded background clips and real-time chroma-key photography.

Thus, referring again to FIG. 1, system 10 may be adapted to a chroma-key system by supplying source 12 with conventional background clips, providing a monochrome background screen and shadowless lighting for camera 14 and reversing the direction of superposition performed by mixer 16. In other respects, system 10 remains essentially as described above, preferably including video monitor 18, media feeder 24, a library containing a plurality of pre-recorded video clips selectable by selector 28, and automated payment system 26.

In order to minimize the sensitivity of the chroma-key filming to variations in ambient lighting conditions, it is preferable that the monochrome screen be an "active" or back-lit panel design. FIG. 6 shows a back-lit monochrome screen panel, generally designated 100, constructed and operative according to the teachings of the present invention. Panel 100 has a flat casing of which one face 102 is a translucent, monochrome filter, typically of blue color. Behind filter 102, a set of lights 104 are arrayed so as to give generally even rear illumination to filter 102. Typically, lights 104 are fluorescent tubes. The back sheet 106 of panel 100 behind lights 104 preferably has a reflective inner surface to increase efficiency and spread light more evenly.

It should be appreciated that panel 100 greatly reduces the problems of implementing chroma-key filming in less-than-ideal lighting conditions. Since the rear illumination is significantly stronger than the light reflected from the front illumination, the screen remains substantially constant in color and brightness over a wide range of lighting conditions. The effectiveness can be further improved by arranging any front lighting to minimize reflection from the front surface of panel 100.

Finally, it should be appreciated that camera control mechanism 50 and lighting control mechanism 90 described above may be employed in the context of a chroma-key embodiment of the present invention to construct a low-cost virtual studio. By changing the position, angle, zoom setting and other characteristics of the camera in step with similar changes in a pre-existing background scene, it is possible to seamlessly paste the real-time chroma-key image of a subject on to the background scene in a very convincing manner. This system can therefore be used to produce very high quality products similar to those produced by virtual studio techniques, without requiring the extremely heavy real-time graphics processing normally employed. As a result, the costs of the system of the present invention are a very small fraction of those incurred using conventional virtual studio techniques.

It will be appreciated that the above descriptions are intended only to serve as examples, and that many other embodiments are possible within the spirit and the scope of the present invention.

What is claimed is:

1. A system for producing a combined video signal mixed from a pre-existing video clip and a real-time video image, the system comprising:

(a) a storage medium storing the pre-existing clip;

(b) a video camera for generating the real-time video image;

(c) a light;

(d) a light control mechanism responsive to data associated with the pre-existing clip to control said light such that a characteristic of the real-time video image varies in substantially the same manner as, and substantially in step with, a corresponding characteristic of the pre-existing clip; and (e) a mixer for mixing the pre-existing video clip and the real-time video image.

2. The system of claim 1, wherein said light control system varies an illumination intensity of said light so as to substantially match apparent lighting variations in the pre-existing clip.

3. The system of claim 1, wherein said light control system varies an angular position of said light so as to substantially match apparent lighting variations in the pre-existing clip.

4. The system of claim 1, wherein said light control system varies an effective light source position so as to substantially match apparent lighting variations in the pre-existing clip.

* * * * *